United States Patent
Muetzel et al.

(10) Patent No.: US 9,049,564 B2
(45) Date of Patent: Jun. 2, 2015

(54) VEHICLE BROADCASTING SYSTEM

(71) Applicant: ZF Friedrichshafen AG, Friedrichshafen (DE)

(72) Inventors: Ronald Muetzel, Hawthorn Woods, IL (US); Sabine Ibele, Ravensburg (DE); Thomas Roesch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 29 days.

(21) Appl. No.: 13/758,892

(22) Filed: Feb. 4, 2013

(65) Prior Publication Data

US 2014/0220966 A1 Aug. 7, 2014

(51) Int. Cl.
| | | |
|---|---|---|
| *H04W 4/04* | (2009.01) | |
| *H04L 12/18* | (2006.01) | |
| *H04W 84/18* | (2009.01) | |
| *H04L 29/08* | (2006.01) | |
| *B60R 25/24* | (2013.01) | |

(52) U.S. Cl.
CPC ............... *H04W 4/046* (2013.01); *H04W 84/18* (2013.01); *H04L 67/12* (2013.01); *B60R 25/24* (2013.01); *H04L 12/189* (2013.01)

(58) Field of Classification Search
CPC ..... H04W 4/02; H04W 64/023; H04W 4/027; H04W 4/046; H04W 84/005; H04W 12/08; H04W 28/06; H04W 36/08; H04W 48/06; H04W 48/18; H04W 48/20; H04W 4/001; H04W 4/023; H04W 4/22; H04W 52/12; H04W 52/143; H04W 52/225; G06Q 50/30; G06Q 30/02; G06Q 30/0241; G06Q 10/0833; G06Q 30/0265; G06Q 20/32; G06Q 30/0251; G06T 2207/30236; H04M 1/6075; H04M 2250/10; H04M 3/42357; H04M 3/4878; H04M 3/493
USPC .............. 455/418, 41.2, 426.1; 701/117–119; 370/338; 340/988, 990, 991, 995.1, 340/995.12, 995.19
See application file for complete search history.

(56) References Cited

U.S. PATENT DOCUMENTS

| | | | | |
|---|---|---|---|---|
| 6,236,337 | B1 * | 5/2001 | Beier et al. ................... | 340/905 |
| 6,952,645 | B1 * | 10/2005 | Jones ........................... | 701/465 |
| 7,181,343 | B2 * | 2/2007 | Mukaiyama ................. | 701/400 |
| 7,840,331 | B2 * | 11/2010 | Yoshioka et al. ............. | 701/96 |
| 8,041,494 | B2 * | 10/2011 | Kubotani et al. ............. | 701/96 |
| 8,145,402 | B2 * | 3/2012 | Craig ............................ | 701/80 |
| 8,179,239 | B2 * | 5/2012 | Chen et al. ................... | 340/435 |
| 8,577,586 | B2 * | 11/2013 | Niki et al. .................... | 701/118 |
| 2002/0142759 | A1 * | 10/2002 | Newell et al. ................ | 455/414 |
| 2005/0088318 | A1 * | 4/2005 | Liu et al. ...................... | 340/902 |
| 2005/0093719 | A1 * | 5/2005 | Okamoto et al. ........... | 340/995.1 |
| 2005/0146445 | A1 * | 7/2005 | Sleboda et al. ............... | 340/988 |
| 2005/0277440 | A1 * | 12/2005 | Van Bosch et al. ........... | 455/557 |
| 2007/0162550 | A1 * | 7/2007 | Rosenberg ................... | 709/206 |

(Continued)

*Primary Examiner* — Olumide T Ajibade Akonai
(74) *Attorney, Agent, or Firm* — Brinks Gilson & Lione (57) ABSTRACT

A vehicle may include a vehicle broadcasting system for providing occupant interaction between one or more vehicle occupants. The on-board device may receive communications from occupants in the vehicle or from a different vehicle within a predetermined communication range. Vehicle occupants may send communications to the on-board device through a communication device, e.g., a cell phone, or through a user interface in the vehicle. The vehicle broadcasting system may implement any number of interaction functionalities, such as supporting a conversation between vehicle occupants, interactive video, game, quiz, karaoke, or other occupant interactions.

10 Claims, 5 Drawing Sheets

(56) References Cited

U.S. PATENT DOCUMENTS

| | | | |
|---|---|---|---|
| 2007/0271035 A1* | 11/2007 | Stoschek et al. | 701/209 |
| 2008/0147308 A1* | 6/2008 | Howard et al. | 701/200 |
| 2009/0231432 A1* | 9/2009 | Grigsy et al. | 348/149 |
| 2010/0250346 A1* | 9/2010 | Bai et al. | 705/14.1 |
| 2010/0253539 A1* | 10/2010 | Seder et al. | 340/903 |
| 2011/0196969 A1* | 8/2011 | Tarte et al. | 709/227 |
| 2011/0244888 A1* | 10/2011 | Ohki | 455/456.2 |
| 2012/0050028 A1* | 3/2012 | Mastronardi et al. | 340/441 |
| 2012/0059534 A1* | 3/2012 | Zilka | 701/2 |
| 2012/0282876 A1* | 11/2012 | Yuasa | 455/404.1 |
| 2013/0157607 A1* | 6/2013 | Paek et al. | 455/404.1 |
| 2014/0038669 A1* | 2/2014 | Shimizu et al. | 455/556.1 |

\* cited by examiner

VEHICLE BROADCASTING SYSTEM

BACKGROUND OF THE INVENTION

1. Field of the Invention

The invention relates to a vehicle broadcasting system. The invention also relates to broadcasting a display to one or more occupants of a vehicle.

2. Related Art

Vehicle occupants can communicate with one another in various ways. In the same vehicle, occupants can communicate directly by speaking with one another. With the widespread adoption of portable electronic devices, occupants may exchange communications through electronic communication devices, which often require availability of a communication network. Vehicle occupants are limited to separate displays as provided by their respective electronic devices. Further, an occupant may be limited to communicating with accessible communication devices, e.g., with her known contacts. Occupants are unable to use communication devices to share a common interaction with other unknown passengers, e.g., strangers, in the vehicle or occupants in other vehicles. Thus, there is a need for supporting a common interaction between vehicle occupants in one or more vehicles.

SUMMARY OF THE INVENTION

The descriptions below include apparatuses and methods for supporting interaction between vehicle occupants in one or more vehicles. A vehicle may include an on-board device that generates a common display for occupants in the vehicle. The on-board device may receive communications from occupants in the vehicle, for example, through the occupants' respective communication devices. The on-board device may receive communications that include a text message, video file, audio file, or other media data for display through a vehicle user interface. The on-board device may also communicate across any number of local area networks or wide area networks to retrieve content for display, such as social media network data.

The on-board device may also retrieve or present content to vehicle occupants based on vehicle position data. The on-board device may retrieve position-specific content in response to various position criteria, such as passing a predetermined geographical boundary. The on-board device may present questions (e.g., trivia questions or educational quizzes) to vehicle occupants based on a current vehicle position or current geographical zone.

Multiple on-board devices in multiple vehicles may coordinate to provide occupant interactions across one or more of the multiple vehicles. The multiple vehicles may share a common traveling route or be within a common communication range. The on-board devices may implement and display any type of game, activity, interactive video, productivity program, or other display or application supporting interaction between occupants of the multiple vehicles. The on-board devices may receive inputs or communications from occupants in the multiple vehicles, for example, through communication devices or dedicated user interfaces in the multiple vehicles. As one example, the on-board devices may display a quizzing game with occupants of each vehicle forming a respective team in the quizzing game. As another example, the on-board devices may display a productivity program, such as a word processor, spreadsheet editor, slide presentation program, web page editor, video editor, photo editor, or other media editor, to enable the occupants of a vehicle or multiple vehicles to collaborate on various media products.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION

Figure 1:
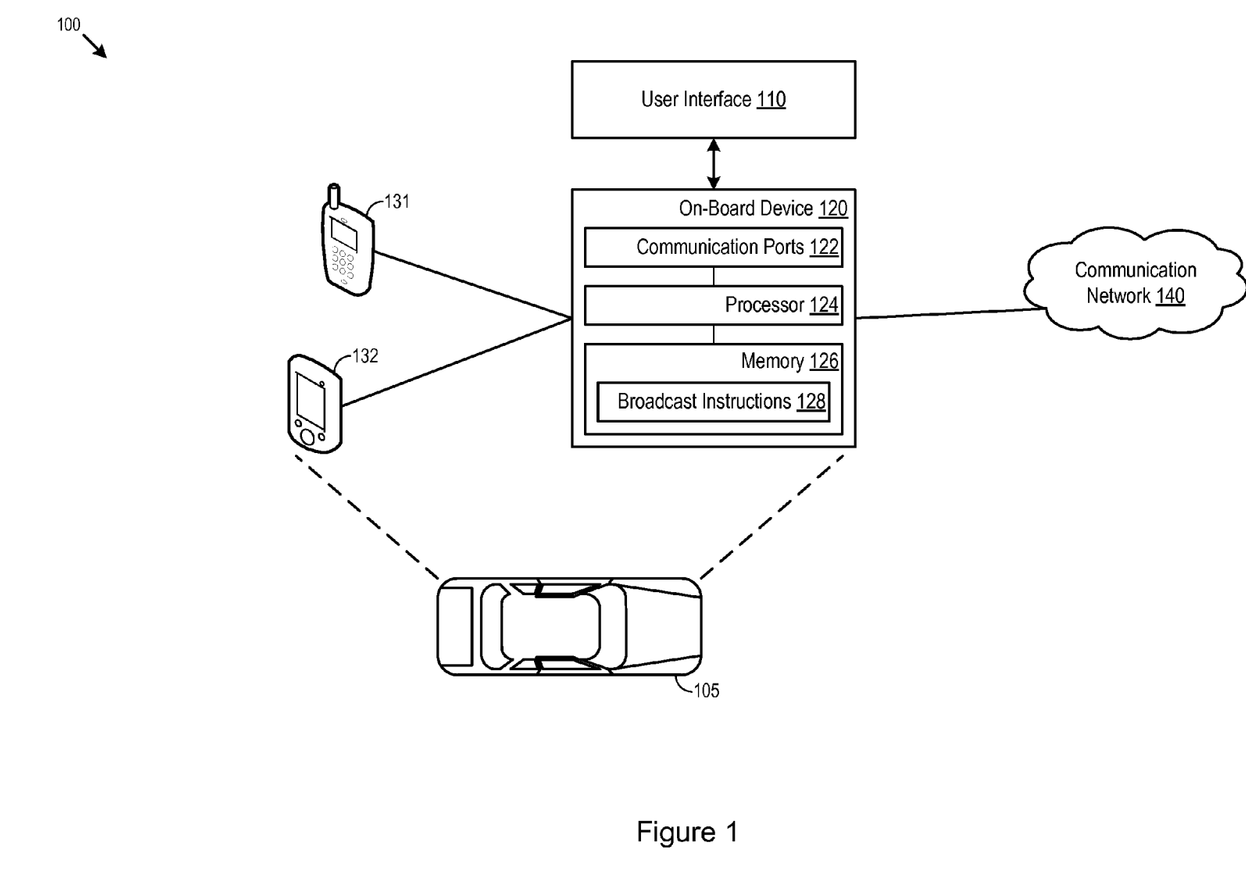
FIG. 1 is a diagram of a vehicle broadcasting system according to one embodiment of the invention.

FIG. 1 illustrates a diagram of a vehicle broadcasting system 100 according to one embodiment of the invention. The vehicle broadcasting system 100 includes vehicle 105. The exemplary vehicle 105 shown in FIG. 1 is an automobile. However, vehicle 105 may take any number of forms, including, as examples, a bus, truck, van, mini-van, sports utility vehicle (SUV), helicopter, airplane, construction vehicle, boat, trailer, all-terrain vehicle (ATV), motorcycle, moped, tractor, hybrid vehicle, electric vehicle, ambulance, marine vessel, boat, submarine, or other vehicle.

Vehicle 105 may include user interface 110, which may be communicatively linked to on-board device 120. Vehicle 105 may also include one or more occupants, e.g., a driver, one or more passengers, or any combination thereof. The occupants may operate communication devices, such as communication devices 131 and 132 depicted in FIG. 1. Communication devices 131 and 132 may be any type of electronic device, such as a cellular phone, tablet, portable music player, laptop computer, electronic notebook, or other device. Communication devices 131 and 132 may also be particularly suited to communicate with on-board device 120, either wirelessly or via a wire or cable. Communication devices 131 and 132 may also include an application that enables communication with on-board device 120. In one embodiment, on-board device 120 may include communication ports 122, a processor 124, and a memory 126 storing broadcast instructions 128.

On-board device 120 may communicate with any number of communication networks, including communication network 140, which may take any number of forms such as a cellular network. On-board device 120 may communicate according to any number of communication protocols, standards, networks, or topologies. As examples, on-board device 120 may communicate across cellular networks or standards (e.g., 2G, 3G, Universal Mobile Telecommunications System (UMTS), GSM® Association, Long Term Evolution (LTE)™, or more), WiMAX, Bluetooth, WiFi (including 802.11 a/b/g/n/ac or others), WiGig, Global Positioning System (GPS) networks, and others available at the time of the filing of this application or that may be developed in the future. On-board device 120 may include processing circuitry, data ports, transmitters, receivers, transceivers, or any combination thereof to communicate across any of the above-listed protocols, standards, networks, or topologies.

On-board device 120 may also communicate with any number of communication devices operated by occupants in vehicle 105, such as communication device 131, communication device 132, or both. In one embodiment, on-board device 120 may implement a local area network (LAN) accessible by occupant communication devices, which may take the form of a wireless LAN (WLAN) or a wireless access point. Communication devices 131 and 132 may directly communicate with the on-board device 120 through the WLAN. Alternatively, on-board device 120 may communicate with occupant communication devices indirectly, e.g., through one or more external communication networks, such as communication network 140, which may be a cellular network.

On-board device 120 may be configured according to any number of user requirements with respect to communication capabilities, data transfer configurations, data collection configurations, and other configurations. On-board device 120 may also collect any vehicle data, such as performance statistics, route information, position data, traffic data, and others. In one example, on-board device 120 may include telemetry functionality to collect and/or send vehicle data. These telemetry functions may include measurements or records of speed, direction, acceleration, pitch, yawl, and roll, and measurements or records of rate of change for speed, direction, acceleration, pitch, yawl, and roll. One example of on-board device 120 is the Openmatics© on-board unit provided by ZF Friedrichshafen AG.

Figure 5:
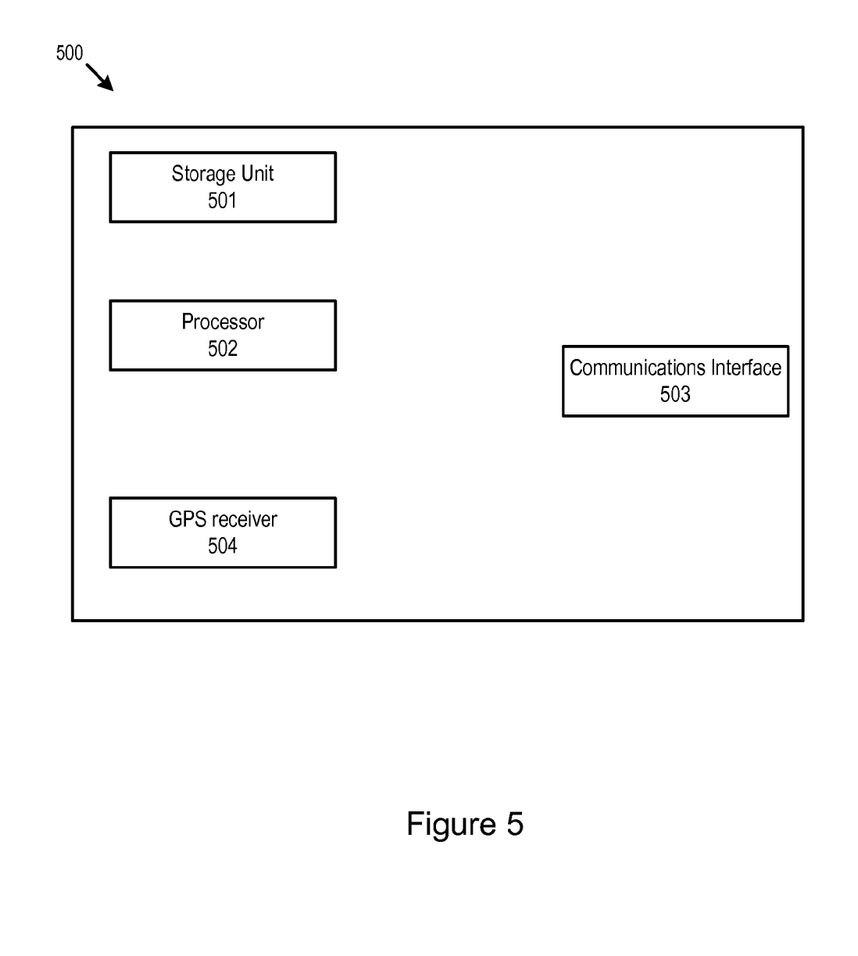
FIG. 5 illustrates a block diagram of an on-board device, according to some embodiments of the present invention.

FIG. 5 illustrates a block diagram for an on-board device 500 according to one embodiment of the invention. The on-board device 500 may include a storage unit 501, processor 502, communications interface 503, and a GPS receiver 504.

On-board device 120 may support interaction between one or more occupants in vehicle 105. As examples, on-board device 120 may generate a display broadcasting a conversation between vehicle occupants (e.g., via text, images, sound, etc.), any type of game to be played by vehicle occupants (e.g., any type of video game, educational quiz, trivia, puzzle, or other game), interactive videos, karaoke, or in support of any other vehicle occupant interactions. In one embodiment, on-board device 120 may execute broadcast instructions 128 stored in the memory 126 to support occupant interaction. For example, broadcast instructions 128 may be downloaded as an application from an external download server. Varying sets of broadcast instructions 128 may correspond to various applications or interaction functionality, e.g., different games, quizzes, trivia, puzzles, or other interactive applications. On-board device 120 may also facilitate collaboration among vehicle occupants to produce media product such as documents, spreadsheets, photos, video, audio, slide presentations, or other electronic content. On-board device 120 may permit multiple users to use a productivity program, such as a word processor, spreadsheet editor, slide presentation program, web page editor, video editor, photo editor, or other media editor, to enable the occupants of a vehicle to collaborate on various media products. Various applications may be installed on communication devices 131 and 132, and on-board device 120 may operate to coordinate data transfer among the communication devices to update the various applications operating on communication devices 131 and 132.

Alternatively, an application may be installed on on-board device 120, which sends and receives display information and user-input information to and from communication devices 131 and 132. This may be advantageous because the application is only installed on one device—on-board device 120—and does not have to be installed on the communications devices 131 and 132. Instead, in this alternative, communication devices 131 and 132 may only require a support application to view and accept user input to be sent to the on-board device 120 as input to the main application running on on-board device 120.

To support occupant interaction, on-board device 120 may receive communications from one or more sources and generate a display in response. For example, on-board device 120 may receive a communication from occupant communication devices 131 and 132. Such communications may include a text message, an image file, a video file, an e-mail, an audio file or sound, or other communications. On-board device 120 may generate a display in response to receiving the communication from an occupant communication device, which may depict or broadcast any portion of the received communication. On-board device 120 may send the generated display to user interface 110 for display to the vehicle occupants. The generated display may include a visual portion, audio portion, or both.

To support occupant interaction, on-board device 120 may also retrieve data from any number of external sources, such as an external server, database, or other sources. For example, on-board device 120 may access content from external sources, such as social networks (e.g., FaceBook®, Twitter®, LinkedIn®, or others), online websites, a central broadcast server or database, or other sources. On-board device 120 may access a particular external source depending on a type of occupant interaction currently implemented by the on-board device 120. For example, on-board device 120 may access a question database when implementing a quizzing game for vehicle occupants.

On-board device 120 may generate a display to support any type of occupant interaction functionality. As mentioned above, on-board device 120 may generate a display implementing a conversation between vehicle occupants (e.g., via text, images, sound, etc.) by receiving communications from occupant communication devices and displaying the communications through user interface 110. On-board device 120 may also implement any type of game to be played by vehicle occupants, such as video games, educational quizzes, puzzle games, or others. In implementing a game, the on-board device 120 may prompt vehicle occupants for an input through a display on user interface 110 and receive the input from communication devices operated by the vehicle occupants. As additional examples, on-board device 120 may implement interactive videos, karaoke, or other vehicle occupant interactions. On-board device 120 may support such occupant interactions by receiving communications from occupant communication devices, retrieving external content, or both. In one implementation, on-board device 120 may also include a memory to store data for a particular occupant interaction functionality, e.g., a question database for a quizzing game.

User interface 110 may present a generated display to vehicle occupants. User interface 110 may be implemented as one or more displays in the vehicle 105. In one example, user interface 110 includes a central display screen. User interface 110 may include multiple display screens as well. User interface 110 may also present an audio portion of a generated display, e.g., as part of a karaoke functionality, by playing an audio file sent from a communication device, retrieved from an external source or local memory, or other audio source.

Figure 2:
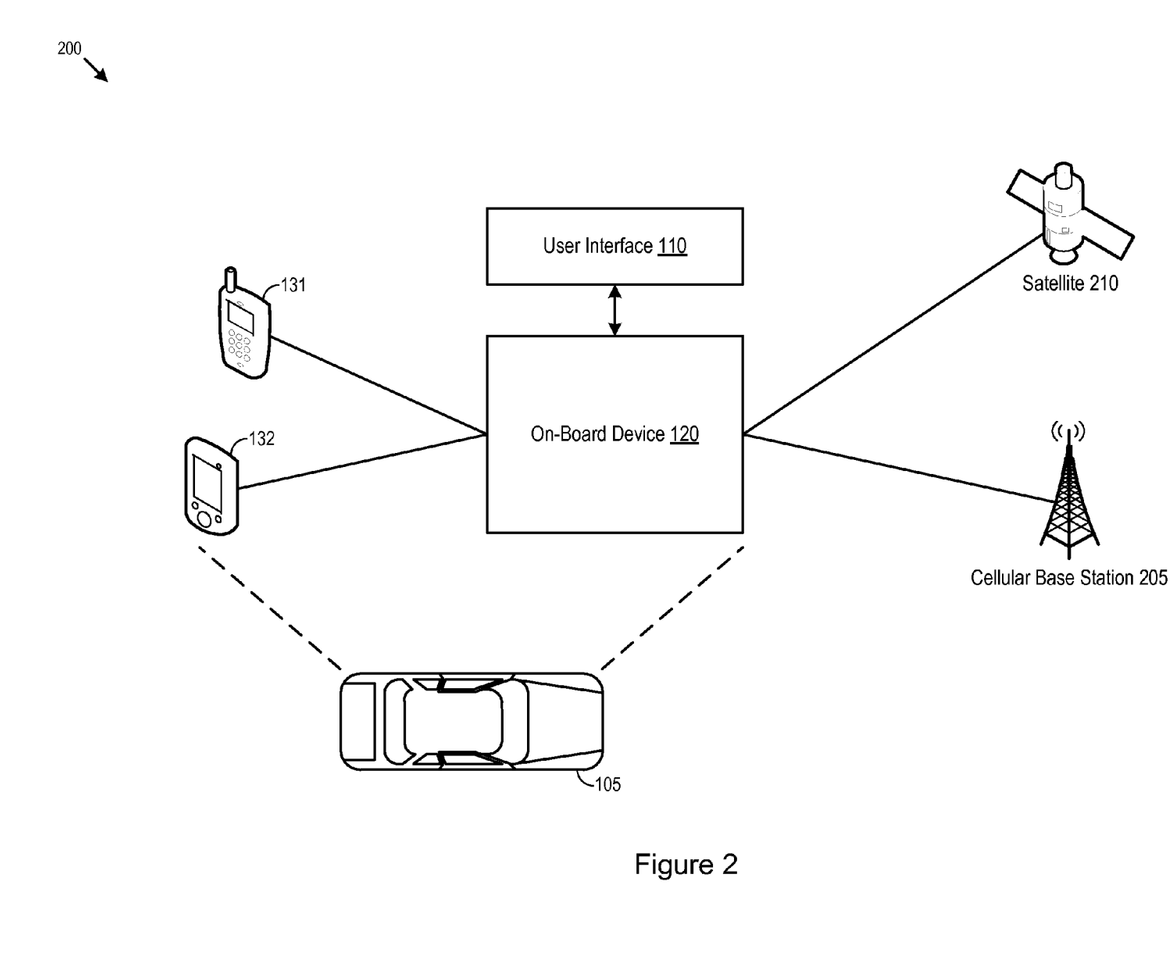
FIG. 2 is a diagram of an vehicle broadcasting system according to one embodiment of the invention.

FIG. 2 illustrates a diagram of a vehicle broadcasting system 200 according to one embodiment of the invention. In FIG. 2, vehicle 105 includes user interface 110 and on-board device 120, as described above. Vehicle 105 also includes occupants operating communication devices 131 and 132. In the vehicle broadcasting system 200, on-board device 120 communicates across a cellular network through cellular base station 205. On-board device 120 may also communicate across a GPS network through satellite 210 to receive and/or send position or location data. This data may be expressed in latitude and longitude coordinates.

On-board device 120 may generate a display based on position data with respect to vehicle 105. On-board device 120 may obtain position data in any number of ways. For example, on-board device 120 may communicate with GPS satellite 210 to retrieve position data with respect to vehicle 105. On-board device 120 may also include telemetry technology to determine position data of the vehicle 105. Position data may include coordinate data, distance data, speed data, or any other data with respect to how vehicle 105 is traveling.

As one example, on-board device 120 may present a quizzing game to vehicle occupants where the quizzing content is based on a current position of vehicle 105 or a current geographical zone vehicle 105 is currently located within. The quizzing content may include specific questions with respect to a current location, geographical zone, or other positional considerations. For example, if vehicle 105 is traveling through Chicago, Ill., the application operating on on-board device 120 may focus or emphasize its content on themes, information, or history related to Chicago, Ill. In the example, of a quizzing game, quiz questions may be about Chicago, Ill. On-board device 120 may present other displays to user interface 110 based on position data of the vehicle 105 as well. For instance, on-board device 120 may present an image or audio file corresponding to a current geographic zone or location. On-board device 120 may present descriptive information related to the current geographic zone or location too.

On-board device 120 may retrieve any of the position-specific content described above according to a trigger based on vehicle position data. On-board device 120 may retrieve the position-specific content from an external server or database or from a local memory. For example, on-board device 120 may retrieve a set of quiz questions, an associated image or audio file, or other data once vehicle 105 passes a predetermined geographical boundary or position. Such geographical boundaries and positions may include a state boundary, country boundary, coordinate, county or city limit boundary, a predefined geographical zone, e.g., an area around a natural landmark such as a river, lake, canyon, mountain, or others, or any other boundary. On-board device 120 may retrieve position-specific content from an external source using any available communication means, including through cellular base station 205.

On-board device 120 may utilize vehicle position data in other ways as well. On-board device 120 may determine when any combination of a predetermined distance, time, coordinates, or other positional criteria has been satisfied, and generate a display in response. For example, on-board device 120 may display a timer based on vehicle position data, which may be used as part of occupant interaction functionality such as a quiz, game, or other interactive functionality. The timer or any other display may be based on an elapsed time, elapsed distance, a geographical boundary passage or any other consideration with respect to vehicle position data.

Figure 3:
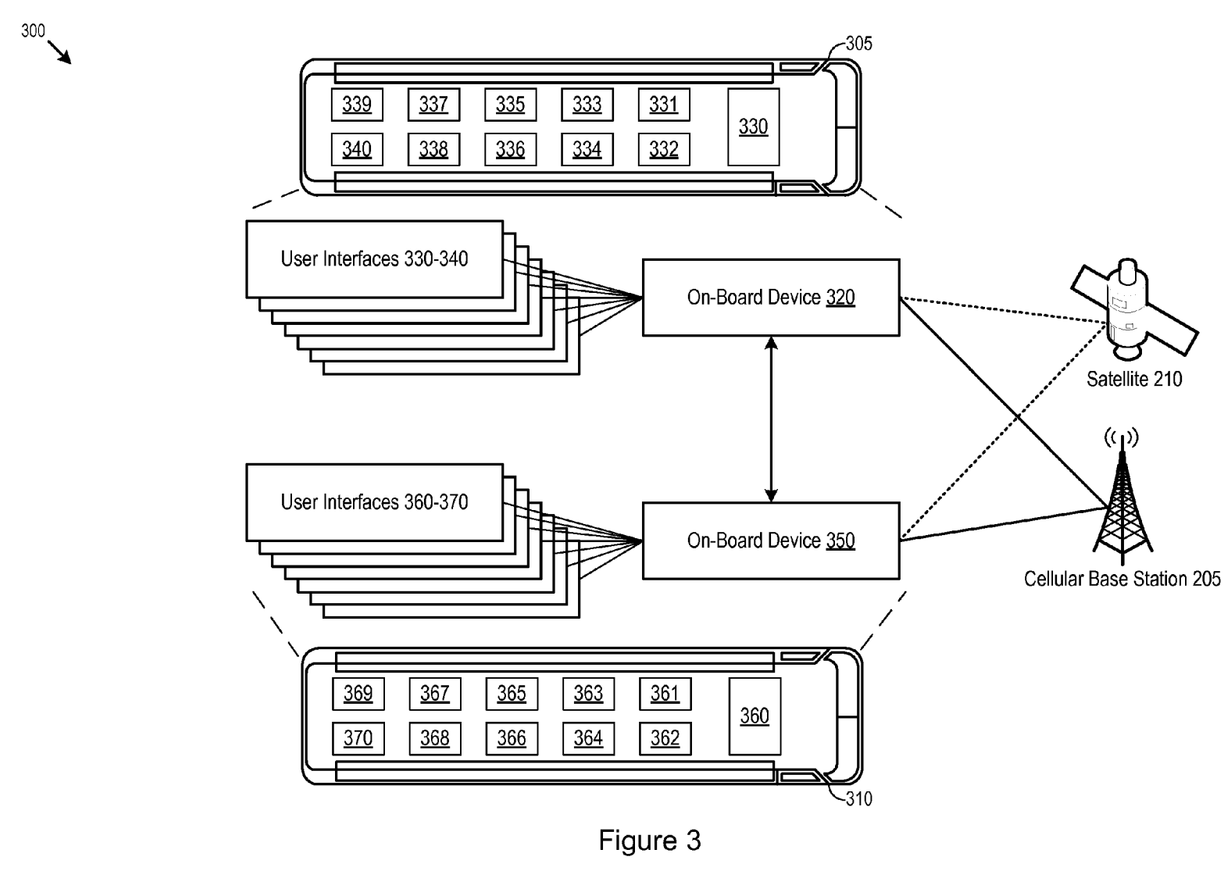
FIG. 3 is a diagram of a vehicle broadcasting system according to one embodiment of the invention.

FIG. 3 is a diagram of a vehicle broadcasting system 300 according to one embodiment of the invention. The vehicle broadcasting system 300 includes vehicles 305 and 310. In FIG. 3, exemplary vehicles 305 and 310 are both buses. However, vehicles 305 and 310 may take any form, including any of the exemplary vehicles listed above.

Vehicle 305 includes on-board device 320, which may share any number of common characteristics with on-board device 120 described above. Vehicle 305 also includes multiple user interfaces labeled as user interfaces 330-340. User interface 330 may be a primary display screen and may also include audio capability or touch-screen functionality. User interfaces 331-340 may be secondary display screens positioned throughout vehicle 305, respectively targeting display to one or more particular bus occupant. On-board device 320 may generate a display for user interfaces 330-340, which may be a common display for all user interfaces or a customized display for each user interface. Variance in display content may depend on interactive functionality currently broadcasted by on-board device 120.

In one implementation, a user interface of vehicles 305 may receive a user input from a vehicle occupant. Instead of, or in addition to, using a communication device to send a communication to on-board device 320, a vehicle occupant may enter an input to any of user interfaces 330-340 for transmission to on-board device 320. For instance, user interfaces 330-340 may include one or more buttons to receive a user input. Additionally or alternatively, user interfaces 330-340 may include touchscreen capability to receive gestures (e.g., a drag or tap gesture) from a vehicle occupant.

Vehicle 310 includes on-board device 350 and user interfaces 360-370, which may share common characteristics with on-board device 320 and user interfaces 330-340 described above with respect to vehicle 305. On-board devices 320 and 350 may each communicate across multiple external networks, such as through a cellular network using cellular base station 205. On-board devices 320 and 350 may also communicate with the GPS satellite 210 to send and/or receive respective vehicle position data.

On-board devices 320 and 350 may be communicatively linked with one another in any number of ways. On-board devices 320 and 350 may indirectly exchange communications through an external network, e.g., through the cellular network. Alternatively or additionally, on-board devices 320 and 350 may exchange communications directly, e.g., through a wireless link established between on-board devices 320 and 350. For example, on-board devices 320 and 350 may directly communicate through a Bluetooth connection, WiFi connection, a proprietary communication connection, or any other wireless communication method.

Direct communications between on-board devices 320 and 350 may be available depending on a communication range of the on-board devices 320 and 350. This may be advantageous where a wider communication network is unavailable. For example, if no cellular network is available, on-board devices 320 and 350 may be able to communicate directly with one another. This permits the occupants of vehicles 310 and 305 to communicate with each other despite the absence of a cellular network or connection.

In one example, vehicles 305 and 310 may be buses traveling along a common route, e.g. as part of a caravan to a common destination. On-board devices 320 and 350 may coordinate to support occupant interaction between one or more occupants of vehicle 305, vehicle 310, or both. For example, on-board devices 320 and 350 may execute broadcast instructions 128 and generate a display to support any type of occupant interaction functionalities discussed above, including video games, quizzes, conversations, social media sharing, or others. On-board device 320 may receive communications from one or more occupants of vehicle 305, e.g., through user interfaces 330-340 or occupant communication devices in vehicle 305. Similarly, on-board device 350 may receive communications from one or more occupants of vehicle 310. Occupants of vehicle 305 may compete or interact with occupants of vehicle 310, e.g., as competing teams in a game or quiz or as different entities in a game implemented by on-board devices 320 and 350. While vehicle broadcasting system 300 depicts interaction between two vehicles through their respective on-board devices, interaction between any number of vehicles or on-board devices is contemplated.

An on-board device of a first vehicle, e.g., vehicle 305, may determine whether to initiate an interaction with an on-board device of second vehicle, e.g., vehicle 310, according to any number of initiation criteria. In one example, the first on-board device of a first vehicle may detect when a second vehicle with a second on-board device (or a second on-board device sharing common broadcast instructions 128 or installed applications) is within a predetermined communication range. Additionally, the first on-board device may determine when the second vehicle is within the predetermined communication range for a timing threshold, e.g., to avoid initiating interaction when the second vehicle is traveling in a divergent or different direction. As another example, upon entering a communication range, on-board devices may share route information to determine whether the first vehicle and second vehicle share a common route or portion thereof. In another implementation, a central server may track position data for any number of vehicles equipping on-board devices and alert a first vehicle when a second vehicle shares a common route, is within a communication range, or meets other initiation criteria. This may be advantageous where two vehicles happen to be sharing a common route, but the occupants of the vehicle are otherwise unaware that the vehicles are sharing a common route. In one example, vehicles operating automatically, e.g., by drive-by-wire, or vehicles equipped with navigation, may be able to share route information with other vehicles automatically.

Figure 4:
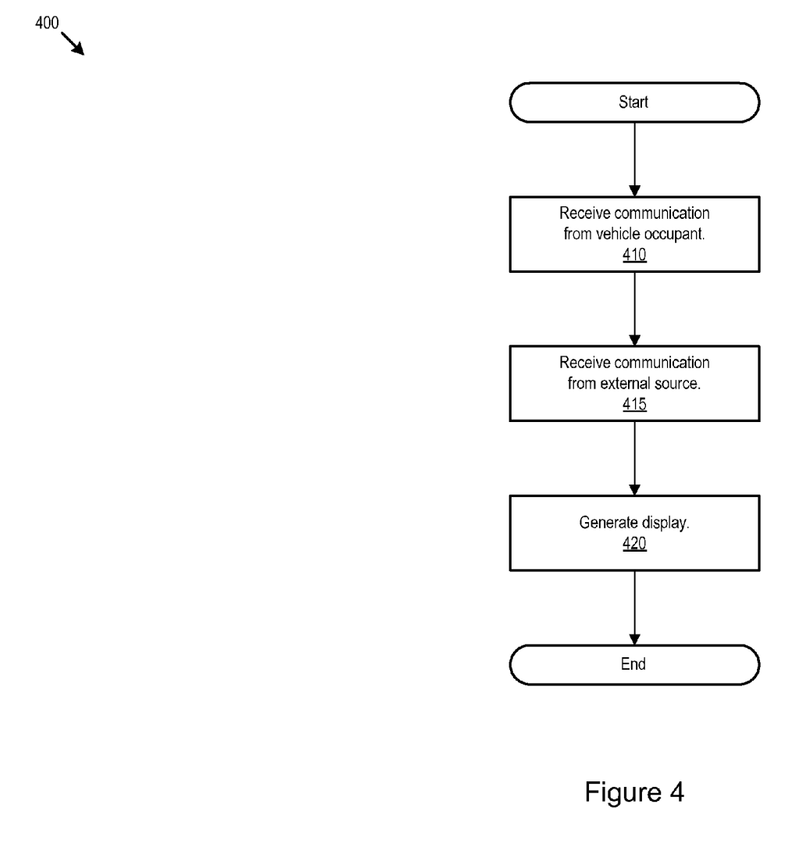
FIG. 4 is a flow diagram of a method for broadcasting a display to one or more vehicles according to another embodiment of the invention.

FIG. 4 is a flow diagram of a method 400 for broadcasting a display to one or more vehicles according to another embodiment of the invention. The method 400 may be implemented as hardware, software, or both. For example, the on-board device 120 may implement the method 400 to provide interaction functionality between vehicle occupants.

The method 400 may start and continue to step 410, when on-board device 120 may receive a communication from a vehicle occupant. On-board device 120 may receive a communication from the vehicle occupant through a communication device operated by the vehicle occupant. The communication device may include a software application, e.g., a software "App," configured to communicate with on-board device 120. The communication may be in any of the forms described above, such as a text message, image file, video file, audio file, or more.

At step 415, on-board device 120 may receive a communication from an external source, such as an external server, database, or other source. The communication may include content retrieved by on-board device 120 based on an occupant interaction functionality currently provided by on-board device 120. The retrieved external content may be based on vehicle position data as well. In one example, the external source may be another on-board device when multiple on-board devices coordinate to provide occupant interaction between multiple vehicles, e.g., as described above with respect to FIG. 3. Additionally or alternatively, on-board device 120 may retrieve content from a local memory implemented by or communicatively linked to on-board device 120.

At step 420, on-board device 120 may generate a display based on the received communication from the vehicle occupant, the received communication from the external source, content retrieved from a local memory, other sources, or any combination thereof. As discussed above, on-board device 120 may generate a display to provide occupant interaction functionality for presentation through a user interface. Interaction functionalities may be in the form of a conversation (e.g., a chat room), interactive video (e.g., karaoke), quizzes, video games (e.g., game show type games), or any number of other interaction functionalities. The on-board device 120 may send the generated display to one or more user interfaces for broadcasting in one or more vehicles.

Methods or processes may be implemented, for example, using a processor and/or instructions or programs stored in a memory. Specific components of the disclosed embodiments may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A vehicle broadcast system comprising:
a user interface in a first vehicle; and
an on-board device communicatively linked to the user interface, the on-board device configured to:
  receive a first communication from a communication device in the first vehicle;
  receive a second communication from a source external to the first vehicle;
  generate a display output based on the first communication, second communication, or both, for presentation in the first vehicle through the user interface;
  detect if a second vehicle is within a predetermined communication range;
  after determining that the second vehicle is within the predetermined communication range, provide route information of the first vehicle to the second vehicle and receive route information from the second vehicle; and
  after determining from the route information of the second vehicle that the first and second vehicles share a common route, initiate communications between the first vehicle and the second vehicle.

2. The vehicle broadcast system of claim 1, where when the on-board device is configured to initiate communications, the communications between the first vehicle and the second vehicle allow occupants of the first and second vehicle to interact as different entities in a game implemented on the on-board device.

3. The vehicle broadcast system of claim 1, where the first communication comprises an image file.

4. The vehicle broadcast system of claim 1, where the first communication comprises media data.

5. The vehicle broadcast system of claim 1, where the first communication comprises a video file.

6. The vehicle broadcast system of claim 1, where the on-board device is further configured to:
   obtain vehicle position data with respect to the first vehicle; and
   generate the display output based on the vehicle position data.

7. The vehicle broadcast system of claim 1, where the on-board device is configured to receive the second communication after passing a predetermined geographical boundary, and where the second communication contains position-specific data related to the predetermined geographical boundary.

8. The vehicle broadcast system of claim 1, where the display output comprises a conversation between occupants of the first vehicle and occupants of the second vehicle.

9. The vehicle broadcast system of claim 2, where the display output is information used in the game.

10. The vehicle broadcast system of claim 9, where the game is a quizzing game based on information obtained from the second communication.

\* \* \* \* \*